May 7, 1929.  C. J. STIRDIVANT  1,712,176
OVERHEAD AIR SERVICE APPLIANCE
Original Filed April 11, 1925   2 Sheets-Sheet 1
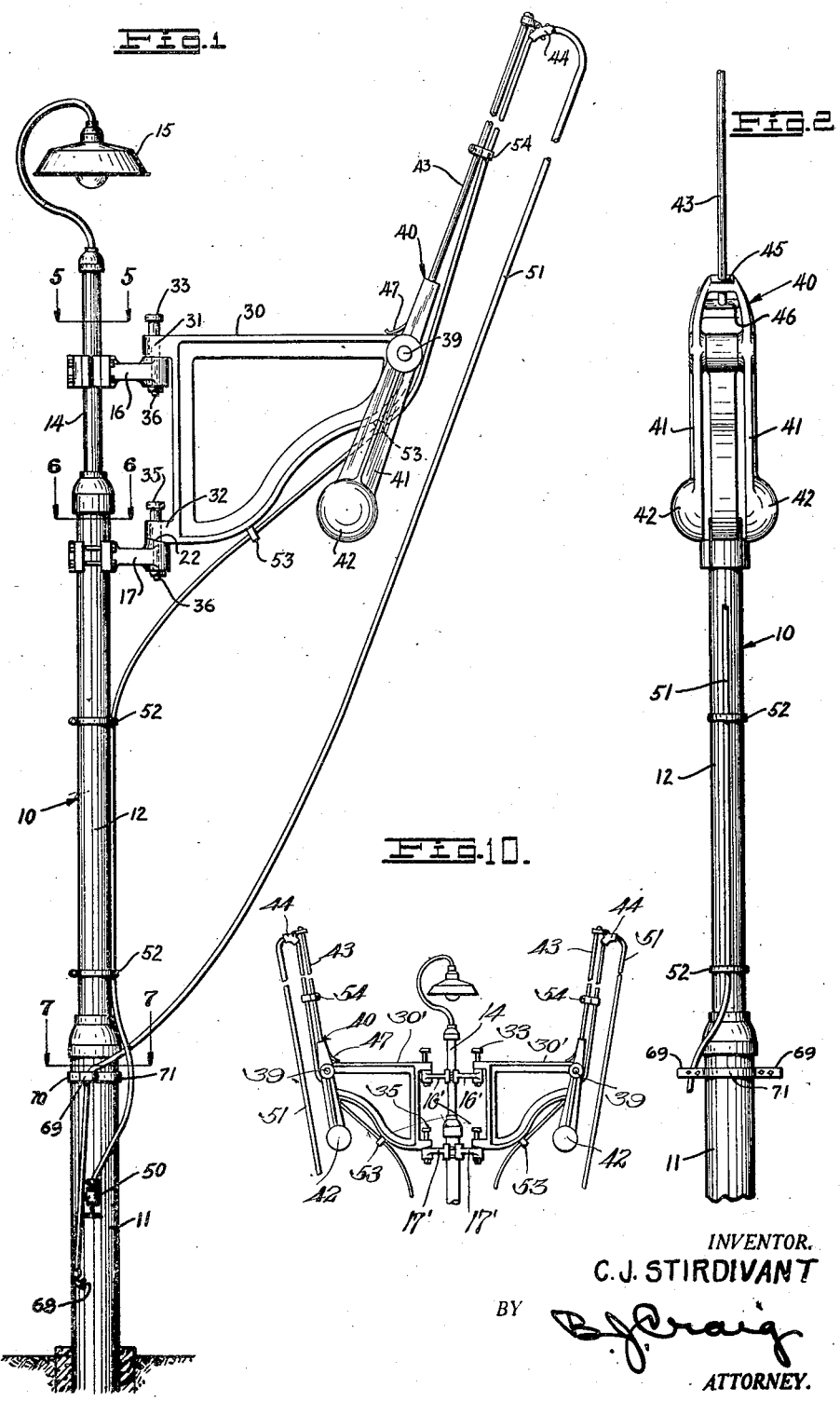
INVENTOR.
C. J. STIRDIVANT
BY
ATTORNEY.

May 7, 1929. C. J. STIRDIVANT 1,712,176
OVERHEAD AIR SERVICE APPLIANCE
Original Filed April 11, 1925  2 Sheets-Sheet 2
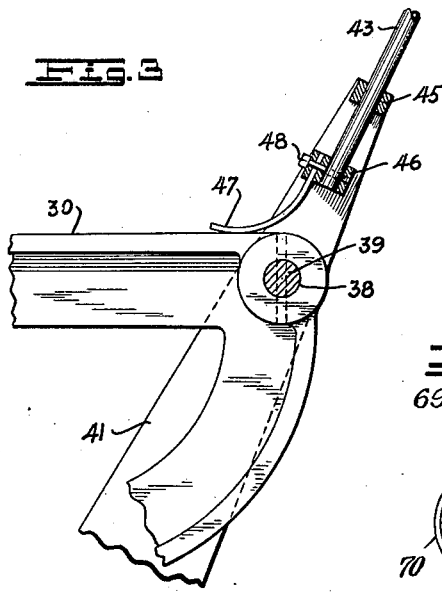
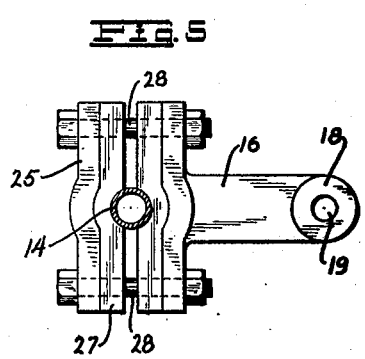
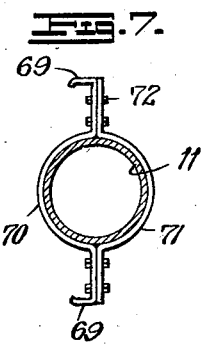
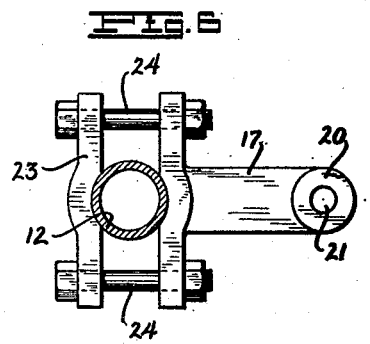
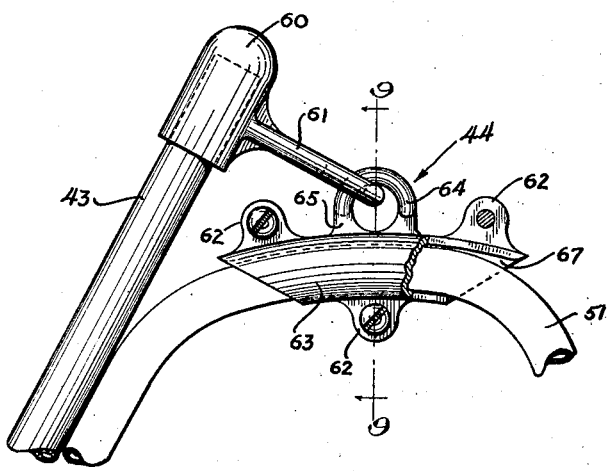
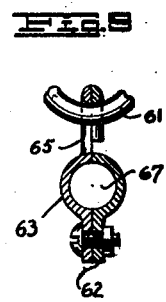
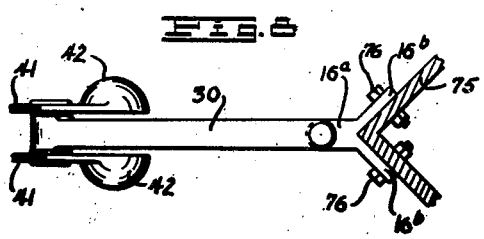
INVENTOR.
C.J. STIRDIVANT
BY
ATTORNEY.

Patented May 7, 1929.

1,712,176

UNITED STATES PATENT OFFICE.

CLARENCE J. STIRDIVANT, OF LOS ANGELES, CALIFORNIA.

OVERHEAD AIR-SERVICE APPLIANCE.

Application filed April 11, 1925, Serial No. 22,311. Renewed February 18, 1929.

This invention relates to overhead air service appliances.

The general object of the invention is to provide an improved air hose support which can be readily arranged upon a vertical standard and wherein means is provided for enabling the user to extend the air hose to the four wheels of an automobile.

Another object of the invention is to provide an improved air service appliance wherein a bracket is provided for adjustable mounting on a vertical support and wherein a swinging hose supporting arm is disposed upon the bracket to allow lateral movement of the arm.

Another object of the invention is to provide an improved means for mounting an air hose upon a service arm.

A further object of the invention is to provide an improved bracket for supporting an air service appliance.

Other objects of the invention will be apparent from the following description taken in connection with the accompanying drawings wherein Fig. 1 is a side elevation showing the features of my invention; Fig. 2 is a rear elevation; Fig. 3 is a fragmentary detail showing the return spring; Fig. 4 is a view similar to Fig. 3 showing the improved hose mounting; Fig. 5 is a section on line 5—5, Fig. 1; Fig. 6 is a section on line 6—6, Fig. 1; Fig. 7 is a section on line 7—7, Fig. 1; Fig. 8 is a fragmentary section showing the manner of securing the rotatable bracket upon a building; Fig. 9 is a section on line 9—9, Fig. 4 and Fig. 10 is a view on a reduced scale showing the use of two of my overhead air service appliances mounted on the same post.

Referring to the drawing by reference characters, I have shown a post at 10. This post may comprise a series of stepped portions 11, 12, and 14 of different diameters surmounted by a light device 15 which is supported in a goose neck.

My invention is particularly adaptable for ready mounting upon vertically extending posts and its construction is such that it is particularly applicable for mounting upon air service posts of the type wherein the hose is loosely supported on a hook.

Many of these air service posts are now in use but with the advent of posts wherein means is provided for allowing a hose to be extended from all parts of the automobile, these air service posts are no longer popular. With the use of my invention the user may change the old type into a new air service appliance quickly and economically.

Referring again to the drawing, I show a pair of brackets comprising upper bracket 16 and lower bracket 17. Each of these brackets comprises two parts. The upper bracket 16 is provided with a boss 18 thereon which is apertured as at 19 for a purpose to be presently described while the lower bracket 17 is provided with a boss 20 apertured as at 21. The upper surface 22 of the boss 20 is plane but is inclined as shown in Fig. 1 for a purpose to be presently described. The bracket 17 is provided with a companion part 23 to which it is secured by fastening members such as bolts 24.

For purposes of economy as well as ornamentation, the portions of the posts 11, 12 and 14 are frequently of different diameters and in order that with my invention the brackets 16 and 17 may be arranged upon the upper parts of the different diameters, I provide shims of varying thickness. The bracket 16 is shown as provided with a companion part 25 and with shims 27 which are arranged to engage the portion 14 of the posts. Suitable bolts 28 will hold the shims in engagement with the posts and support the bracket.

Mounted upon the brackets 16 and 17, I show a rotatable support 30. This support is provided with projections 31 and 32. The projection 31 is apertured to receive a pivoting member 33 which passes through the apertures 19 in the bracket 16. The lower projection 32 likewise receives a pivot 35. The lower portion of the projection 32 is beveled in manner similar to the portion 22 on the bracket 17. When the rotatable support 30 is swung from the frontal position the bevelled engaging surfaces will cause it to automatically return to frontal position when it is released.

The pivots 33 and 35 are provided with shoulders which fit the upper portions of the brackets 16 and 17 respectively. Nuts 36 engage the portion of reduced diameter to hold the pivots 33 and 35 in place.

The rotatable support is shown as provided adjacent its outer end with an aperture 38. This aperture 38 receives a shaft 39 on which an arm 40 is pivotally mounted. This arm 40 is arranged in the shape of an inverted U with the two arms 41 each provided with a weighted portion 42 which may be substantially semispherical in shape. At the junction of the arms 41 is an extension 43 upon which a hose mounting 44 is arranged. The extension 43 is arranged in a pair of spaced closing members 45, and 46 in which it is received in apertures. The closing member 46 is provided with a slot (see Fig. 3) in which a leaf spring 47 is inserted. A fastening member 48 serves to hold both the leaf spring 47 and the extension 43 in position.

The leaf spring 47 engages the upper portion of the rotatable support 30 and cushions the pivoted arm 40 as it returns to the position shown in Fig. 1 when it is released.

A valve is shown at 50. This valve is in communication with a source of compressed air and is connected with a hose 51 which is held against the post 10 by clamping members 52. Eyes 53 on the rotatable support 30 receive the hose so that it may freely move therethrough. The hose is freely movable through these eyes 53. A clamping member is shown at 54 for clamping the hose upon the extension 43. The hose mounting shown at 44 and heretofore mentioned is secured upon the extension 43 by means of an end cap 60. This end cap 60 has an eye portion 61 thereon. The hose mounting 44 comprises a pair of companion members 62 and 63, which are provided with reversely directed hooks 64 and 65 and the parts 62 and 63 are so arranged that when they are fitted together the parts 64 and 65 will make a complete eye which will loosely engage the eye 61 to give a universal mounting for the hose. The hose 51 passes freely through the aperture 67, as shown in Fig. 4.

In using the device when the extension 43 is moving downwardly the hose will slide through the eye 53 and the slack in the hose will be taken care of.

The end of the hose is provided with a nipple 68 and the pipe 11 is provided with hose holding loops 69. These hose holding loops comprise a member 70 which comprises members 70 and 71 which surround the portion 11 of the post 10 and are secured by fastening members 72.

It may frequently be desirable to use a pair of rotatable supports and pivoted arms upon the same post. Should this prove desirable, I may mount a pair of my appliances on one post by using two pairs of the brackets, one above the other so that the rotatable supports and pivoted arms will be located at different heights, or if desired instead of using the companion members 23 and 25 as shown in Figs. 5 and 6 for the brackets, I may use other brackets 16' and 17' and on these brackets mount rotatable supports 30' as shown in dotted lines in Fig. 1.

It will be understood that the brackets 16' and 17' might be similar in all respects to the supports already described.

When securing overhead air appliances embodying the features of my invention on the wall of a building as at 75, in Fig. 8, I provide the brackets 16ᵃ with angle portions 16ᵇ which may be shaped to fit the portion of the building upon which they are engaged. The portion 16ᵃ and 16ᵇ may be fastened to the building by bolts 76 or in any other desired manner.

Having thus described my invention, I claim:

1. In an air service appliance, a supporting member, a supporting bracket engaging said member, means to adjustably support said bracket on said member, a support, said support being elongated and having one end rotatably mounted on said bracket to swing about an axis which is parallel to and spaced from the supporting member, and an arm mounted to swing on the other end of said support.

2. In an air service appliance, a supporting post, a bracket thereon, a shaft arranged upon said bracket, a support including a part engaging said shaft and mounted upon said shaft to rotate about an axis arranged at one side of the post, an arm pivotally mounted adjacent to the end of said support, and means to cause said support to return to one position.

3. In a device of the class described, a supporting bracket, means to hold said supporting bracket in operative position, an elongated support having one end rotatable on said bracket about an axis spaced from said means, an arm mounted upon the other end of said support to swing about a horizontal axis, an air hose mounted upon said arm, and an air hose support adjacent the outer end of said arm.

4. In an air service appliance, a post, a pair of spaced brackets arranged on said post, each of said brackets comprising a pair of oppositely directed upper and lower members directly connected together, an elongated rotatable support pivotally mounted at one end upon each pair of members, said support being spaced from said post, an arm mounted upon the other end of the support and means for securing an air hose upon each of the arms.

5. In an air service appliance, a post, a bracket secured upon said post, a rotatable support secured upon said bracket, a U-shaped member pivoted to said support to turn about a horizontal pivot, one end of said U having weights thereon and the base thereof comprising a transverse member, an arm secured on said transverse member, said transverse member having a slot therein, a spring inserted in said slot, means for securing said spring in position, said support having a part thereof arranged adjacent to said spring and adapted to be engaged by the spring whereby return movement of said member in one direction will be cushioned.

6. In an air service appliance, a support, a hose mounting supported thereby, said hose mounting including a pair of separably united complemental members each having an open hook at the top and a depression extending the length thereof, said depressions registering to provide an aperture to receive a hose, and said hooks being oppositely directed and engaging to make a complete closed loop, and means upon said arm loosely engaging said loop to support said mounting for free movement.

7. In an air service appliance, a supporting member, a bracket secured upon said member, a rotatable support secured upon said bracket, a U-shaped member pivoted to said support to turn about a horizontal pivot, one end of said U having weights thereon and the base thereof comprising a transverse member, an arm secured on said transverse member, said transverse member having a slot therein, a spring inserted in said slot and a single means for securing said arm and said spring in position, said spring engaging a portion of said support to cushion said U-shaped member when it moves in one direction.

In testimony whereof, I hereunto affix my signature.

CLARENCE J. STIRDIVANT.